Patented July 3, 1945

2,379,414

UNITED STATES PATENT OFFICE 2,379,414

MANUFACTURE OF UNSATURATED HALOGEN-CONTAINING COMPOUNDS

Oliver W. Cass, Niagara Falls, N. Y., assignor to E. I. du Pont de Nemours & Company, Wilmington, Del., a corporation of Delaware No Drawing. Application October 12, 1942, Serial No. 461,765

17 Claims. (Cl. 260—654)

This invention relates to the preparation of unsaturated halogenated hydrocarbons and, more particularly, it is directed to the preparation of polyhalogenated olefines by reacting oxygen and a halogen with an unsaturated aliphatic halide of lower chlorine content than that of the halogenated product desired.

While chlorine and oxygen have previously been reacted with saturated hydrocarbons, with aromatic hydrocarbons, and with acetylenic hydrocarbons, it has not previously been considered possible to carry out substitution halogenation of an unsaturated compound by utilizing a halogen as one of the reagents, under such conditions that substantially all the halogen reacted enters the unsaturated compound, no appreciable amount of hydrogen halide being formed. Ordinarily when a halogen is reacted with an unsaturated organic compound the halogen has added thereto. I have now found that it is possible to effect substitution halogenation of an olefine, or of a halogenated olefine, utilizing a halogen as one of the reagents, the substitution halogenation being carried out so that substantially all the halogen reacted is introduced into the olefin or halogenated olefin, none being lost in the form of hydrogen halide.

One of the objects of this invention is the provision of a new and improved method for the preparation of unsaturated aliphatic halides. Another object of this invention is to provide a method for preparing unsaturated aliphatic halides wherein oxygen, a halogen, and an unsaturated aliphatic halide of lower halogen content are utilized as the starting materials. A further object is the development of a method for the preparation of unsaturated aliphatic halides wherein substitution halogenation products are the predominant compounds resulting, to the substantial exclusion of halogen addition products. These and still further objects and advantages of my invention will be apparent from the ensuing disclosure of certain preferred embodiments thereof.

These objects are attained in accordance with the present invention by reacting an unsaturated aliphatic halide with a halogen and oxygen in the presence of an oxidation catalyst at a temperature within the range 200 to 600° C., this process resulting in the predominant production of substitution halogenation products, particularly unsaturated aliphatic halides of higher halogen content than the unsaturated aliphatic halide starting material. Thus, for example, by reacting vinyl chloride with chlorine and oxygen I may obtain a product consisting predominantly of trichlorethylene and perchlorethylene. Similarly, by reacting dichlorethylene (ether symmetrical dichlorethylene or unsymmetrical dichlorethylene), with chlorine and oxygen, a substitution reaction product consisting predominantly of trichlorethylene and perchlorethylene results. The reactions which occur may be represented by the following equations:

With vinyl chloride as the starting material:

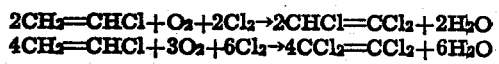

With symmetrical dichlorethylene as the starting material:

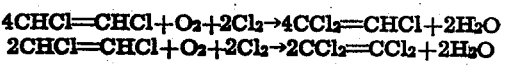

With unsymmetrical dichlorethylene as the starting material:

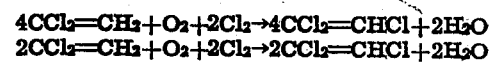

These reactions and similar reactions using other starting materials may be carried out by mixing the unsaturated aliphatic halide starting material with halogen, and oxygen or air, and passing the mixture over the catalyst in a heated or cooled reaction chamber. If desired, the three constituents may be introduced into the reaction space in separate streams, or the air or oxygen may be introduced into a mixture of the olefine and halogen. However reaction between the olefine and halogen, or between the olefine and oxygen, before the third reagent is introduced, should be prevented by keeping the mixture below reaction temperature.

The reaction products may be recovered by subjecting the gases leaving the reaction chamber to refrigeration in order to condense the halogenated olefins. The crude liquid product, after neutralizing the free acid present, may then be separated into its various constituents by usual methods of fractional distillation. Instead of refrigeration, other well-understood methods, or combinations of methods, such, for example, as compression and cooling to secure condensation, or scrubbing with aqueous or other scrubbing liquids, may be utilized to recover the products.

The relative proportions of the reagents used will vary considerably depending upon the particular unsaturated aliphatic halide starting material employed and the desired final product. For example, as indicated by the equations given above, 2 moles of chlorine and 1 mole of oxygen are required for converting 2 moles of vinyl chloride to trichlorethylene, whereas 6 moles of chlorine and 3 moles of oxygen are required for converting 4 moles of vinyl chloride to perchlorethylene. In practice, of course, not all the halogen will be reacted, usually about 5 to 10% of the amount fed into the reaction chamber remaining as free halogen in the reaction products, while about 90 to 95% of the halogen supplied is converted into halogenated hydrocarbons.

The use of an oxidation catalyst is essential in order to obtain good yields of unsaturated aliphatic halides. Practically all of the oxidation catalysts known in the art are effective, at least to some degree, in promoting the reaction. In general, I prefer to utilize metals or metal compounds such as oxides and salts. My preferred catalysts are oxides or compounds of copper, iron, and bismuth and, in general, the best results are obtained by the use of a copper catalyst which may be in the metallic state, in the form of copper oxide, or a copper salt. Many other metals and their compounds have, however, been found to be effective, among them zinc oxide, barium oxide, alumina, various rare earth oxides, magnesium oxide, manganese oxide, silver oxide, titanium dioxide, lead oxide, bismuth oxide, cobalt oxide, nickel oxide, magnesium sulfate, and molybdenum dioxide.

Preferably the catalysts are deposited on refractory supports such as pumice, silica gel, alumina gel, fire brick, porcelain or the like. Such supported catalysts may readily be prepared by saturating a porous refractory material with a solution of the metal salt or metal compound. If the metal compound used is readily converted to the oxide under the conditions of the reaction, it is simply necessary to dry the saturated catalyst support and it is then ready for use. In other cases it may be preferable first to reduce the metal compound on the support to the metallic form which may then be oxidized, preferably by heating the catalyst in an atmosphere of air or oxygen prior to use. The various methods known for preparing catalysts in accordance with these principles may be utilized in practicing my invention. I have obtained excellent results in a large number of reactions by saturating fire brick with solutions of copper salts such as the sulfate, nitrate or chloride.

In carrying out the reaction between an unsaturated aliphatic halide, a halogen, an oxygen, either as oxygen gas or in the form of air, I prefer to utilize a temperature within the range 200 to 600° C. Generally best results will be secured by operating in the range 400 to 500° C. when the halogen is chlorine, and in the range 250 to 350° C. when the halogen is bromine.

As the reaction may be carried out with chlorine, or with bromine, (to prepare the corresponding brominated olefines), in the appended claims I refer to a halogen having a molecular weight between 70 and 160, thus including chlorine and bromine.

While in the foregoing description of the invention reference has been particularly made to unsaturated aliphatic halides derived from ethylene, the invention is not restricted to the use of such halides as it is applicable to the halogenation of halogenated olefinic hydrocarbons generally. Thus when allyl chloride is reacted with oxygen and chlorine under similar conditions various higher chlorinated propylenes are obtained as the principal products. When 2-chlorobutene-2 is reacted with oxygen and chlorine, the resulting product consists predominantly of polychlorobutylenes. Similarly, vinyl bromide reacted with air and bromine, under the conditions of my process, results in a high yield of polybrominated ethylenes.

It should be understood that the invention is not confined to the specific embodiments herein described as illustrative of preferred procedures, but includes all variations, modifications and equivalents not departing from the scope of the invention and falling within the scope of the appended claims.

I claim:

1. The method of effecting substitution halogenation of an unsaturated aliphatic halide containing from 2 to 4 carbon atoms which comprises contacting said halide, at a temperature between 200° C. and 600° C. and in the presence of a catalyst taken from the group consisting of metal, metal oxide, and metal salt oxidation catalysts with oxygen and a halogen having a molecular weight between 70 and 160 in the ratio of one mole oxygen to two moles halogen.

2. The method of effecting substitution chlorination of a halogenated olefinic hydrocarbon containing from 2 to 4 carbon atoms which comprises contacting said hydrocarbon, at a temperature between 200° C. and 600° C. and in the presence of a catalyst taken from the group consisting of metal, metal oxide, and metal salt oxidation catalysts, with chlorine and oxygen in the ratio of one mole oxygen to two moles chlorine.

3. The method of effecting substitution chlorination of a halogenated olefinic hydrocarbon containing from 2 to 4 carbon atoms which comprises contacting said hydrocarbon, at a temperature between 200° C. and 600° C. and in the presence of a metal oxide oxidation catalyst, with chlorine and oxygen in the ratio of one mole oxygen to two moles chlorine.

4. The method of effecting substitution chlorination of a halogenated olefinic hydrocarbon containing from 2 to 4 carbon atoms which comprises contacting said hydrocarbon, at a temperature between 200° C. and 600° C. and in the presence of a copper salt oxidation catalyst, with chlorine and oxygen in the ratio of one mole oxygen to two moles chlorine.

5. The method of effecting substitution chlorination of a halogenated olefinic hydrocarbon containing from 2 to 4 carbon atoms which comprises contacting said hydrocarbon, at a temperature between 400° C. and 500° C. and in the presence of a copper salt oxidation catalyst, with chlorine and oxygen in the ratio of one mole oxygen to two moles chlorine.

6. The method of effecting substitution halogenation of vinyl chloride which comprises contacting said vinyl chloride, at a temperature between 200° C. and 600° C. and in the presence of a catalyst taken from the group consisting of metal, metal oxide, and metal salt oxidation catalysts, with oxygen and a halogen having a molecular weight between 70 and 160 in the ratio of one mole oxygen to two moles halogen.

7. The method of effecting substitution chlorination of vinyl chloride which comprises contacting said vinyl chloride, at a temperature between 200° C. and 600° C. and in the presence of a catalyst taken from the group consisting of metal, metal oxide, and metal salt oxidation catalysts, with chlorine and oxygen in the ratio of one mole oxygen to two moles chlorine.

8. The method of effecting substitution chlorination of vinyl chloride which comprises contacting said vinyl chloride, at a temperature between 200° C. and 600° C. and in the presence of a copper salt oxidation catalyst, which chlorine and oxygen in the ratio of one mole oxygen to two moles chlorine.

9. The method of effecting substitution halogenation of a halogenated olefinic hydrocarbon containing from 2 to 4 carbon atoms which comprises contacting said hydrocarbon, at a temperature between 200° C. and 600° C. and in the presence of a metal oxide oxidation catalyst, with oxygen and a halogen having a molecular weight between 70 and 160 in the ratio of one mole oxygen to two moles halogen.

10. The method of effecting substitution halogenation of a halogenated olefinic hydrocarbon containing from 2 to 4 carbon atoms which comprises contacting said hydrocarbon, at a temperature of between 200° C. and 600° C. and in the presence of a copper salt oxidation catalyst, with oxygen and a halogen having a molecular weight between 70 and 160 in the ratio of one mole oxygen to two moles halogen.

11. The method of effecting substitution halogenation of a halogenated olefinic hydrocarbon containing from 2 to 4 carbon atoms which comprises contacting said hydrocarbon, at a temperature between 400° C. and 500° C. and in the presence of a copper salt oxidation catalyst, with oxygen and a halogen having a molecular weight between 70 and 160 in the ratio of one mole oxygen to two moles halogen.

12. The method of effecting substitution halogenation of dichlorethylene which comprises contacting said dichlorethylene, at a temperature between 200° C. and 600° C. and in the presence of a catalyst taken from the group consisting of metal, metal oxide, and metal salt oxidation catalysts, with oxygen and a halogen having a molecular weight between 70 and 160 in the ratio of one mole oxygen to two moles halogen.

13. The method of effecting substitution chlorination of dichlorethylene which comprises contacting said dichlorethylene, at a temperature between 200° C. and 600° C. and in the presence of a catalyst taken from the group consisting of metal, metal oxide, and metal salt oxidation catalysts, with chlorine and oxygen in the ratio of one mole oxygen to two moles chlorine.

14. The method of effecting substitution chlorination of dichlorethylene which comprises contacting said dichlorethylene, at a temperature between 200° C. and 600° C. and in the presence of a copper salt oxidation catalyst, with chlorine and oxygen in the ratio of one mole oxygen to two moles chlorine.

15. The method of effecting substitution halogenation of trichlorethylene which comprises contacting trichlorethylene, at a temperature between 200° C. and 600° C. and in the presence of a catalyst taken from the group consisting of metal, metal oxide, and metal salt oxidation catalysts with oxygen and a halogen having a molecular weight between 70 and 160 in the ratio of one mole oxygen to two moles halogen.

16. The method of effecting substitution chlorination of trichlorethylene which comprises contacting said trichlorethylene, at a temperature between 200° and 600° C. and in the presence of a catalyst taken from the group consisting of metal, metal oxide, and metal salt oxidation catalysts, with chlorine and oxygen in the ratio of one mole oxygen to two moles chlorine.

17. The method of effecting substitution chlorination of trichlorethylene which comprises contacting said trichlorethylene, at a temperature between 200° C. and 600° C. and in the presence of a copper salt oxidation catalyst, with chlorine and oxygen in the ratio of one mole oxygen to two moles chlorine.

OLIVER W. CASS.